US012791466B2

(12) United States Patent
Georgin et al.

(10) Patent No.: US 12,791,466 B2
(45) Date of Patent: Nov. 10, 2026

(54) ESTIMATING A COEFFICIENT OF FRICTION (μ) OF RUNWAYS AND/OR TAXIWAYS

(71) Applicant: GOODRICH CORPORATION, Charlotte, NC (US)

(72) Inventors: Marc J. Georgin, Oakwood, OH (US); Kaman Thapa Magar, Beavercreek, OH (US); Suk-Min Moon, Greenwood, IN (US)

(73) Assignee: GOODRICH CORPORATION, Charlotte, NC (US)

( * ) Notice: Subject to any disclaimer, the term of this patent is extended or adjusted under 35 U.S.C. 154(b) by 214 days.

(21) Appl. No.: 18/661,392

(22) Filed: May 10, 2024

(65) Prior Publication Data

US 2025/0347615 A1 Nov. 13, 2025

(51) Int. Cl.

| | |
|---|---|
| ***G01N 19/02*** | (2006.01) |
| ***B60T 8/1763*** | (2006.01) |
| ***B60T 17/22*** | (2006.01) |
| *B64C 25/42* | (2006.01) |

(52) U.S. Cl.

CPC ............ *G01N 19/02* (2013.01); *B60T 8/1763* (2013.01); *B60T 17/22* (2013.01); *B60T 2210/12* (2013.01); *B60T 2240/02* (2013.01); *B64C 25/42* (2013.01)

(58) Field of Classification Search

CPC ... G01N 19/02; B60T 8/1763; B60T 2210/12; B60T 2240/02

See application file for complete search history.

(56) References Cited

U.S. PATENT DOCUMENTS

| | | | | |
|---|---|---|---|---|
| 6,125,318 | A | 9/2000 | Zierolf | |
| 8,630,782 | B2 * | 1/2014 | Rado | B60T 8/171 701/80 |
| 8,843,254 | B2 * | 9/2014 | Cahill | B60T 8/1703 701/14 |
| 9,156,451 | B2 | 10/2015 | Metzger, Jr. et al. | |
| 9,260,183 | B2 | 2/2016 | Rado | |
| 9,428,161 | B2 | 8/2016 | Metzger, Jr. | |
| 9,434,479 | B2 | 9/2016 | Metzger, Jr. | |
| 10,147,331 | B1 | 12/2018 | Georgin | |
| 10,202,204 | B1 | 2/2019 | Daidzic | |
| 10,730,491 | B2 | 8/2020 | Krucinski et al. | |
| 2016/0140854 | A1 | 5/2016 | Enns et al. | |

FOREIGN PATENT DOCUMENTS

| | | |
|---|---|---|
| WO | 2023007083 | 2/2023 |

* cited by examiner

*Primary Examiner* — Erika J. Villaluna

(74) *Attorney, Agent, or Firm* — SNELL & WILMER L.L.P.

(57) ABSTRACT

A method for estimating a peak coefficient of friction ($\mu_{Peak}$) at a location on a runway or taxiway is provided. Responsive to detecting braking of an aircraft a first coefficient of friction (μ) and a first wheel slip (λ) are determined at a first time $t_1$ associated with a first location. A second coefficient of friction (μ) and a second wheel slip (λ) are determined at a second time $t_2$ associated with a second location. A peak coefficient of friction ($\mu_{Peak}$) is then estimated using the first coefficient of friction (μ), the first wheel slip (λ), the second coefficient of friction (μ), and a second wheel slip (λ) for at least one of a first location or a second location.

20 Claims, 4 Drawing Sheets

ESTIMATING A COEFFICIENT OF FRICTION (μ) OF RUNWAYS AND/OR TAXIWAYS

FIELD

The present disclosure generally relates to the field of aircraft and, more particularly, to estimating a coefficient of friction (μ) for runways and/or taxiways.

BACKGROUND

Aircraft typically include a braking system operatively coupled to the wheels of the aircraft and configured to slow the wheels, and the aircraft, during, for example, landing or a rejected takeoff. Aircraft braking systems tend to utilize aircraft brake controllers, i.e. a brake control unit (BCU), to control various aspects of the braking system. In this regard, as a pilot applies force to the brake pedals, the BCU detects the force applied by the pilot and produces a braking command to control the amount of braking at each wheel, i.e. a pressure or force applied at the brake that is increased to decelerate the wheel and aircraft.

SUMMARY

According to various embodiments of the present disclosure, a method for estimating a peak coefficient of friction ($\mu_{Peak}$) at a location on a runway or taxiway is provided. The method includes, responsive to detecting braking of an aircraft, determining a first coefficient of friction (μ) and a first wheel slip (λ) at a first time $t_1$ associated with a first location and determining a second coefficient of friction (μ) and a second wheel slip (λ) at a second time $t_2$ associated with a second location. The method further includes estimating the peak coefficient of friction ($\mu_{Peak}$) for at least one of a first location or a second location.

In various embodiments, the first coefficient of friction (μ) and the second coefficient of friction (μ) are determined using aircraft deceleration $a_x$, an aerodynamic drag force ($F_{aero}$), a thrust force ($F_{tr}$), a mass (m) of the aircraft, and a gravitational constant (g).

In various embodiments, the mass of the aircraft is a portion of a total mass of the aircraft and wherein the portion of the total mass of the aircraft is the portion associated with a landing gear where the first coefficient of friction (μ) and the second coefficient of friction (μ) are being determined.

In various embodiments, the aircraft deceleration $a_x$ is determined using a force applied to brakes of the aircraft ($F_{brk}$), the aerodynamic drag force ($F_{aero}$), the thrust force ($F_{tr}$), and the mass (m) of the aircraft.

In various embodiments, the mass of the aircraft is a portion of a total mass of the aircraft and wherein the portion of the total mass of the aircraft is the portion associated with a landing gear where the first coefficient of friction (μ) and the second coefficient of friction (μ) are being determined.

In various embodiments, the first wheel slip (λ) and the second wheel slip (λ) are determined using a velocity (v) of the aircraft, a radius (R) of a wheel and a tire of a landing gear together, and a rotation (ω) of the wheel.

In various embodiments, the radius (R) of the wheel and the tire of the landing gear together is reduced by a deflection of the tire upon landing.

In various embodiments, the rotation (ω) of the wheel is determined using a wheel speed sensor.

In various embodiments, the method further includes determining a coefficient of friction (μ) and wheel slip (λ) every time t from initial touchdown on the runway to parking the aircraft at a gate and estimating a separate peak coefficient of friction ($\mu_{Peak}$) for each two contiguous times $t_1$ and $t_2$.

In various embodiments, the method further includes reporting the estimated peak coefficient of friction ($\mu_{Peak}$) to at least one of an airport authority or another aircraft.

Also disclosed herein is a system for estimating a peak coefficient of friction ($\mu_{Peak}$) at a location on a runway or taxiway. The system includes a brake control unit. The brake control unit is configured to determine a first coefficient of friction (μ) and a first wheel slip (λ) at a first time $t_1$ associated with a first location, determine a second coefficient of friction (μ) and a second wheel slip (λ) at a second time $t_2$ associated with a second location, and estimate the peak coefficient of friction ($\mu_{Peak}$) for at least one of a first location or a second location.

In various embodiments, the first coefficient of friction (μ) and the second coefficient of friction (μ) are determined using aircraft deceleration $a_x$, an aerodynamic drag force ($F_{aero}$), a thrust force ($F_{tr}$), a mass (m) of the aircraft, and a gravitational constant (g).

In various embodiments, the mass of the aircraft is a portion of a total mass of the aircraft and wherein the portion of the total mass of the aircraft is the portion associated with a landing gear where the first coefficient of friction (μ) and the second coefficient of friction (μ) are being determined.

In various embodiments, the aircraft deceleration $a_x$ is determined using a force applied to brakes of the aircraft ($F_{brk}$), the aerodynamic drag force ($F_{aero}$), the thrust force ($F_{tr}$), and the mass (m) of the aircraft.

In various embodiments, the mass of the aircraft is a portion of a total mass of the aircraft and wherein the portion of the total mass of the aircraft is the portion associated with a landing gear where the first coefficient of friction (μ) and the second coefficient of friction (μ) are being determined.

In various embodiments, the first wheel slip (λ) and the second wheel slip (λ) are determined using a velocity (v) of the aircraft, a radius (R) of a wheel and a tire of a landing gear together, and a rotation (ω) of the wheel.

In various embodiments, the radius (R) of the wheel and the tire of the landing gear together is reduced by a deflection of the tire upon landing.

In various embodiments, the rotation (ω) of the wheel is determined using a wheel speed sensor.

In various embodiments, the brake control unit is further configured to determine coefficient of friction (μ) and wheel slip (λ) every time t from initial touchdown on the runway to parking the aircraft at a gate and estimate a separate peak coefficient of friction ($\mu_{Peak}$) for each two contiguous times $t_1$ and $t_2$.

In various embodiments, the brake control unit is further configured to report the estimated peak coefficient of friction ($\mu_{Peak}$) to at least one of an airport authority or another aircraft.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
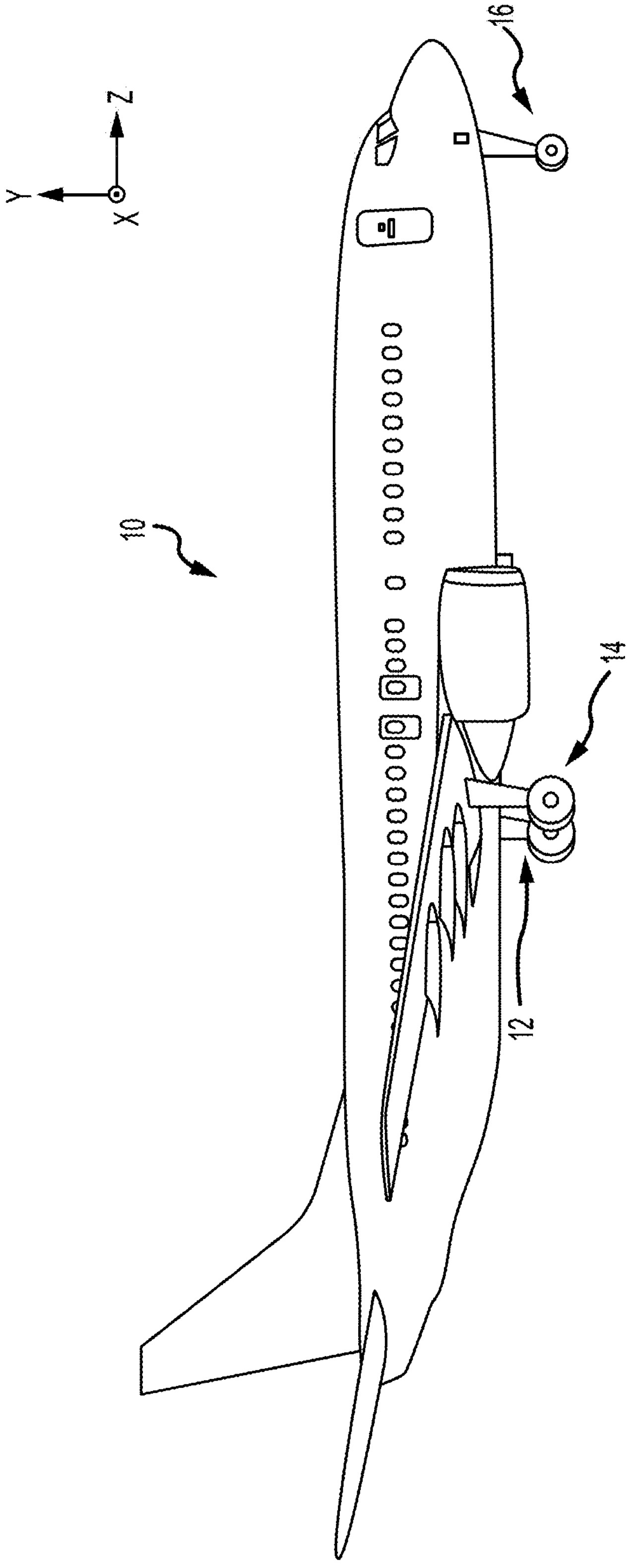
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Typically, an aircraft brake control system (BCS) has a capability to assess a coefficient of friction (μ) for airport runways. The assessed coefficient of friction (μ) may be provided to airport authorities in order to assist pilots of other aircrafts during landing and further assist in minimizing runway excursion events. However, the typical BCS only determines a peak runway coefficient of friction ($\mu_{Peak}$) when antiskid is active for the aircraft during dry, wet, or icy weather conditions. When antiskid is not active and the aircraft is braking, the runway coefficient of friction (μ) determined by the BCS is unfortunately not the peak runway coefficient of friction ($\mu_{Peak}$). That is, the peak coefficient of friction ($\mu_{Peak}$) may be $\mu_{Peak}$=0.6 for a dry runway, $\mu_{Peak}$=0.35 for a wet dry runway, and $\mu_{Peak}$=0.1 for a slippery/icy runway. Thus, typical assessment of the coefficient of friction (μ) is only during landing and only when antiskid is active. That is, typical BCS do not assess a coefficient of friction (μ) on taxiways. Providing a coefficient of friction when antiskid is inactive and for both runways and taxiways would be useful to safely operate the aircraft around the airport and prepare for degraded braking performance as aircraft follow each other in a congested airport.

Therefore, disclosed herein are methods and systems for estimating peak coefficient of friction ($\mu_{Peak}$) for runways and/or taxiways in various weather conditions. In various embodiments, a coefficient of friction (μ) and a wheel slip (λ) at a first time $t_1$ associated first location (i.e. GPS coordinates) and at a second time $t_2$ associated second location (i.e. GPS coordinates) are determined so that a peak coefficient of friction ($\mu_{Peak}$) on a runway or a taxiway at a particular location may be identified. In various embodiments, a difference between time $t_1$ and time $t_2$ may be between 0.10 seconds and 1 second. In various embodiments, a difference between time $t_1$ and time $t_2$ may be between 0.25 seconds and 0.75 seconds. In various embodiments, a difference between time $t_1$ and time $t_2$ may be between 0.5 seconds. In various embodiments, determining the coefficient of friction (μ) may utilize a force applied to the aircraft brakes ($F_{brk}$), an aerodynamic drag force ($F_{aero}$), a thrust (either reverse thrust or low level thrust during taxi ($F_{tr}$), provided by aircraft engines, aircraft deceleration $a_x$, and an aircraft weight (W), i.e. aircraft mass (m) multiplied by gravity (g) for each of time $t_1$ and time $t_2$. In various embodiments, determining the wheel slip (λ) utilizes a velocity (v) of the aircraft, a radius (R) of the wheel and tire together, and a rotation (ω) of the wheel at each of time $t_1$ and time $t_2$. In various embodiments, with the coefficient of friction (μ) and the wheel slip (λ) at each of time $t_1$ and time $t_2$, a coefficient of friction (μ) and wheel slip (λ) curve equation may be utilized to resolve values for peak wheel slip ($\lambda_{Peak}$) and peak coefficient of friction ($\mu_{Peak}$) and thus determine a peak coefficient of friction ($\mu_{Peak}$) for a runway or a taxiway location associated with the GPS coordinates at time $t_1$ and/or time $t_2$.

Referring now to FIG. 1, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 2:
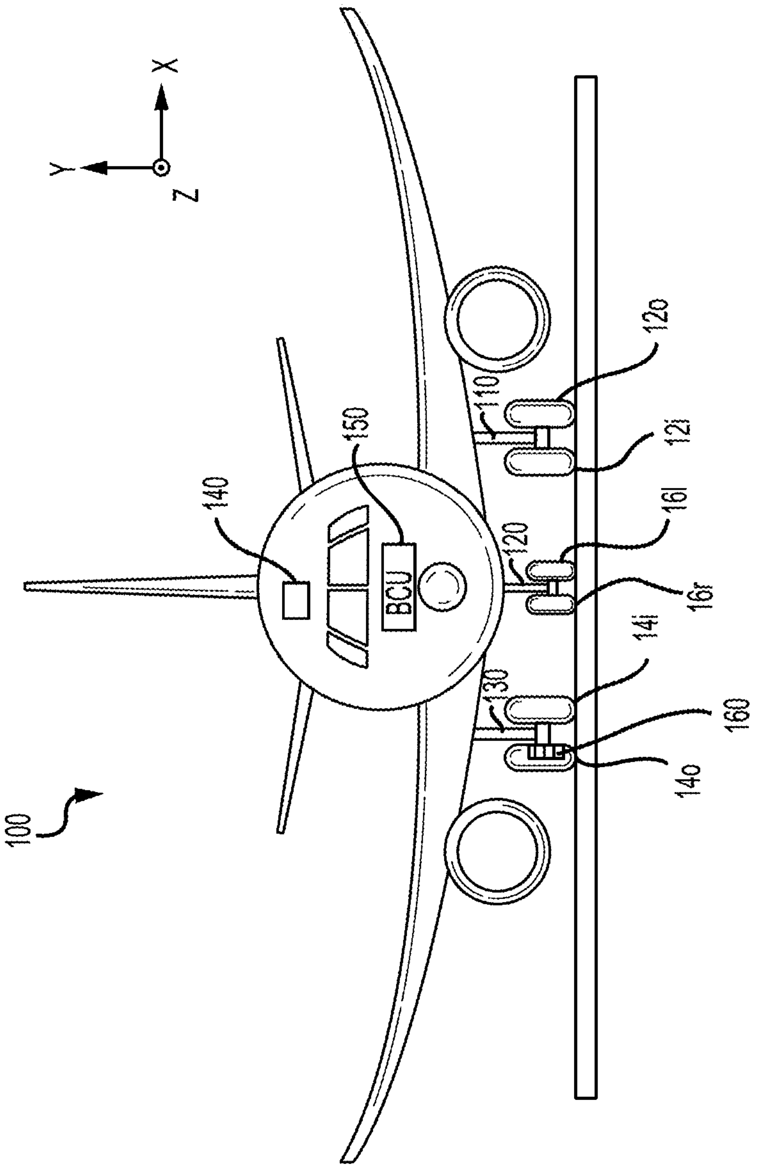
FIG. 2 illustrates an aircraft including multiple landing gear systems, in accordance with various embodiments.

Turning now to FIG. 2, in accordance with various embodiments, an aircraft 100 includes multiple landing gear systems, including a first landing gear 110, second landing gear 120, and third landing gear 130 is illustrated. The first landing gear 110, second landing gear 120, and third landing gear 130 each include one or more wheel assemblies. In various embodiments, the second landing gear 120, which is also a nose landing gear for the aircraft 100, includes a left wheel assembly 161 and a right wheel assembly **16*r*. In various embodiments, the first landing gear 110 includes an inboard wheel assembly 12*i* and an outer wheel assembly 12*o*, and the third landing gear 130 includes an inner wheel assembly 14*i* and an outer wheel assembly 14*o*. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and often times, one or more of the first landing gear 110, second landing gear 120, and third landing gear 130 are operationally retractable into the aircraft 100 when the aircraft 100** is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

In various embodiments, the aircraft 100 further includes one or more brakes coupled to each wheel assembly. For example, a brake 160 is coupled to the outer wheel assembly **14*o* of the third landing gear 130 of the aircraft 100. In operation, the brake 160 applies a braking force to the outer wheel assembly 14*o* upon receiving a brake command, such as from the BCU 150. In various embodiments, the outer wheel assembly 14*o* of the third landing gear 130 of the aircraft 100** includes any number of wheels.

As stated previously, in order to estimate peak coefficient of friction ($\mu_{Peak}$) for runways and/or taxiways in various weather conditions, a coefficient of friction ($\mu$) and a wheel slip ($\lambda$) at a first time $t_1$ associated first location (i.e. GPS coordinates) and at a second time $t_2$ associated second location (i.e. GPS coordinates) are determined. In order to determine the coefficient of friction ($\mu$), in various embodiments, an avionics units, such as avionics unit 140 of FIG. 2, measures three main forces during braking that are responsible for aircraft deceleration, i.e. a force applied to the brakes ($F_{brk}$), an aerodynamic drag force ($F_{aero}$), and a thrust force ($F_{tr}$) (either reverse thrust or low level thrust during taxi) provided by the engines. During braking, an aircraft deceleration $a_x$ of the aircraft may be determined by:

$$a_x = \frac{Fbrk + Faero + Ftr}{m} \tag{1}$$

wherein m is the mass of the aircraft. In various embodiments, the mass m of the aircraft may be adjusted during braking responsive to the mass balance between the main landing gear and the nose landing gear. In that regard, responsive to the coefficient of friction ($\mu$) being determined for the main landing gear, the mass may be a portion of a total mass of the aircraft as the mass is distributed between the main landing gear and the nose landing gear. Accordingly, the coefficient of friction ($\mu$) for the aircraft at a particular time may be determined using the following formula:

$$\mu = \frac{1}{g}\left(a_x - \frac{Faero}{m} - \frac{Ftr}{m}\right) \tag{2}$$

where g is the gravitational constant. Thus, the coefficient of friction ($\mu$) value corresponds to an operating point of the brake control unit (BCU), such as brake control unit (BCU) 150 of FIG. 2. In various embodiments, responsive to the aircraft is slowing down and no skidding being detected by the BCU, then $\mu<\mu_{max}$. In various embodiments, the $\mu_{max}$ value corresponds to runway or taxiway coefficient of friction that needs to be estimated at the particular runway or taxiway location. In various embodiments, responsive to the BCU detecting an antiskid condition, the coefficient of friction ($\mu$) value determined using Equation 1 may be that $\mu=\mu_{max}$. Therefore, in various embodiments, responsive to braking being commanded on landing or taxiing, the coefficient of friction ($\mu$) for the aircraft at a particular time may be determined, which may then be utilized for estimating a peak coefficient of friction ($\mu_{Peak}$) for locations on runways and/or taxiways.

In order to determine the wheel slip ($\lambda$), the avionics unit provides a velocity ($v$) of the aircraft, a radius (R) of the wheel and tire together, and a rotation ($\omega$) of the wheel, which may be measured by a wheel speed sensor coupled to the avionics unit. In various embodiments, the radius (R) of the wheel and tire together may or may not include tire deflection upon landing. In that regard, in various embodiments, if tire deflection is known, then the radius (R) of the wheel and tire together minus the deflection would be used as the radius (R) of the wheel and tire together. In various embodiments, the wheel slip ($\lambda$) for a particular time may be determined using the following formula:

$$\lambda = \frac{V_{Aircraft} - R\cdot\omega}{V_{Aircraft}}. \tag{3}$$

With values of coefficient of friction ($\mu$) and wheel slip ($\lambda$) determined at a first time $t_1$ associated first location (i.e. GPS coordinates) and at a second time $t_2$ associated second location (i.e. GPS coordinates), the following coefficient of friction ($\mu$) and wheel slip ($\lambda$) curve equation may then be utilized to resolve for peak wheel slip ($\lambda_{Peak}$) and peak coefficient of friction ($\mu_{Peak}$) using any numerical method that allows for solving two equations with two unknowns, such as:

$$\mu = \frac{2\cdot\mu_{Peak}\cdot\lambda}{\lambda_{peak}\cdot\left(1+\left(\frac{\lambda}{\lambda_{Peak}}\right)^2\right)}. \tag{4}$$

That is, in various embodiments, using Equations 1, 2, and 3 above at time $t_1$ and time $t_2$, $\lambda_1$ and $\mu_1$ and $\lambda_2$ and $\mu_2$ are determined, respectively. Equation 4 is solved for peak coefficient of friction ($\mu_{Peak}$) using $\lambda_1$ and $\mu_1$ in terms of unknown peak wheel slip ($\lambda_{Peak}$) and that $\mu_{Peak}$ value is then substituted in Equation 4 to solve for peak wheel slip ($\lambda_{Peak}$) using $\lambda_2$ and $\lambda_2$. The process may then be repeated at $t_3$ using data from time $t_2$ and $t_3$, and so on. Since the GPS coordinates associated with the first time $t_1$ and the second time $t_2$ are recorded, i.e. the GPS coordinates were recorded at the first time $t_1$ and the second time $t_2$, the peak coefficient of friction ($\mu_{Peak}$) at the first time $t_1$ and/or the second time $t_2$, depending on the order of solving Equation 4, may be determined whether it be on a runway or on a taxiway.

Figure 3:
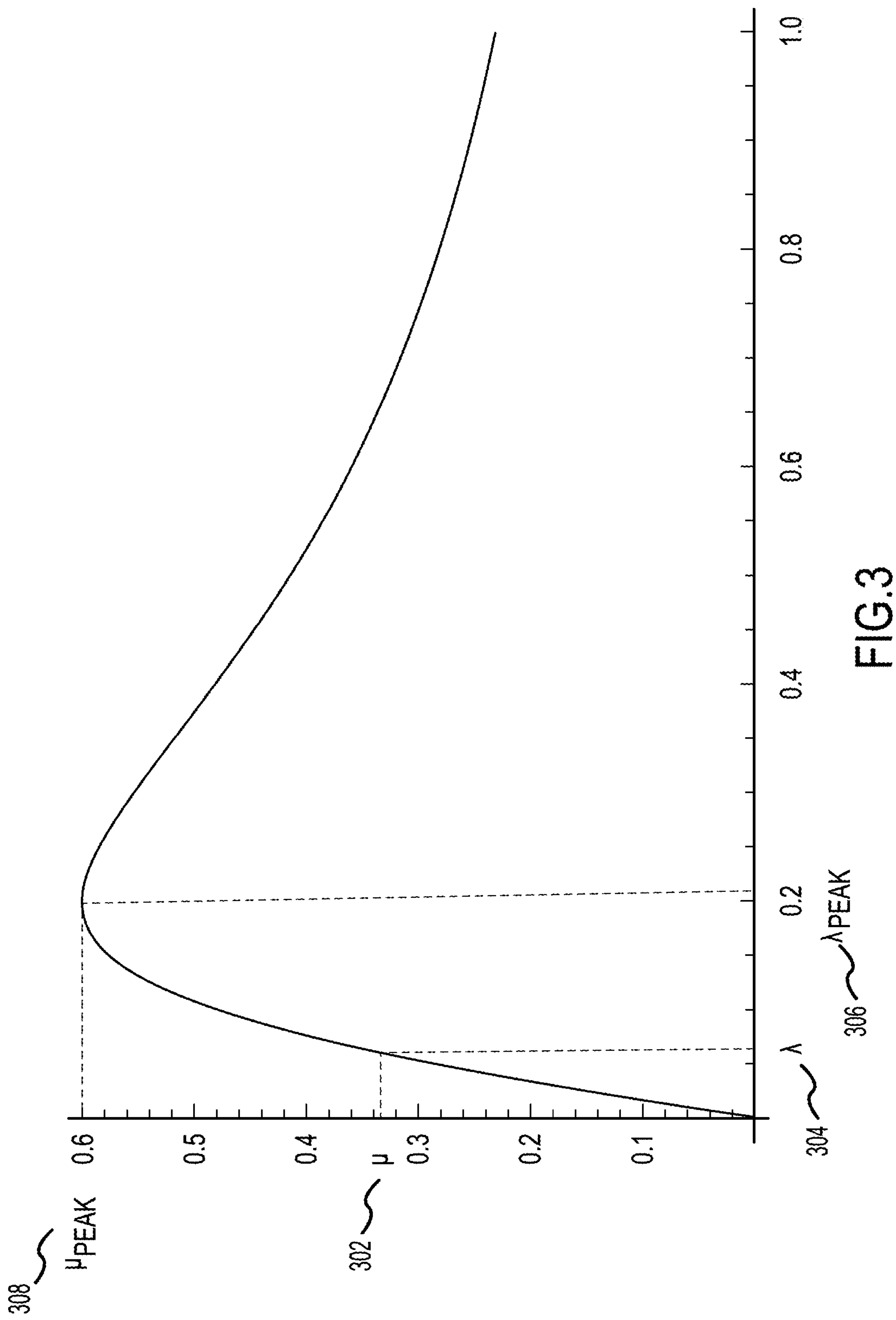
FIG. 3 illustrates a coefficient of friction (μ)/wheel slip (λ) curve, in accordance with various embodiments.

With temporary reference to FIG. 3, in accordance with various embodiments, a coefficient of friction ($\mu$)/wheel slip ($\lambda$) curve is illustrated. In various embodiments, utilizing information obtained from an avionics unit, the BCS may determine a coefficient of friction ($\mu$) 302 using Equations 1 and 2 and a may determine a wheel slip ($\lambda$) 304 using Equation 3 for two different but contiguous times, i.e. a first time $t_1$ and a second time $t_2$. Equation 4 is solved for either peak wheel slip ($\lambda_{Peak}$) 306 or peak coefficient of friction ($\mu_{Peak}$) 308 at the first time $t_1$ and then that value is substituted into Equation 4 at the second time $t_2$ to identify the unsolved value of either peak wheel slip ($\lambda_{Peak}$) 306 or peak coefficient of friction ($\mu_{Peak}$) 308.

Returning to FIG. 2, in various embodiments, the BCU may determine a coefficient of friction ($\mu$) and wheel slip ($\lambda$) every time t from initial touchdown on a runway to parking the aircraft at a gate. In that regard, in various embodiments, a peak coefficient of friction ($\mu_{Peak}$) may be determined at numerous location on the runway and taxiway leading to the gate. Each peak coefficient of friction ($\mu_{Peak}$) having an associated GPS coordinate. In various embodiments, once at the gate, the BCU may transmit the determined peak coefficient of friction ($\mu_{Peak}$) values to airport authorities and these peak coefficient of friction ($\mu_{Peak}$) values may be passed on to other aircraft that are landing or taxiing so that those aircrafts may have an initial idea about landing and taxiing conditions prior to landing and taxiing. In various embodiments, the BCU may transmit the determined peak coefficient of friction ($\mu_{Peak}$) values at standard intervals up until and including arriving at the gate to airport authorities and these peak coefficient of friction ($\mu_{Peak}$) values may be passed on to other aircraft that are landing or taxiing so that those aircrafts may have an initial idea about landing and taxiing conditions prior to landing and taxiing.

Figure 4:
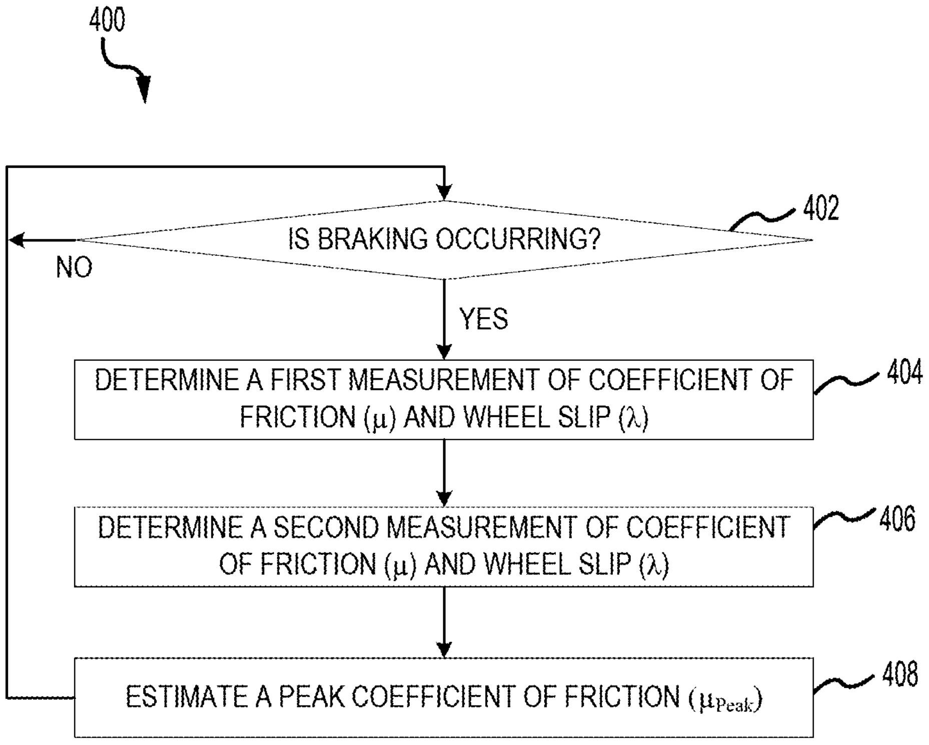
FIG. 4 illustrates a method for estimating a peak coefficient of friction ($\mu_{Peak}$) at a location on a runway or taxiway, in accordance with various embodiments.

Referring now to FIG. 4, in accordance with various embodiments, a method 400 for estimating a peak coefficient of friction ($\mu_{Peak}$) at a location on a runway or taxiway is illustrated. Method 400 may be performed by processor within a brake control unit (BCU), such as BCU 150 of FIG. 2. At block 402, the BCU determines whether braking of aircraft is occurring. If at block 402 the BCU determines that no braking is occurring, then the operation returns to block 402. If at block 402 the BCU determines that braking is occurring, then, at block 404, the BCU determines a first coefficient of friction ($\mu$) and a first wheel slip ($\lambda$) at a first time $t_1$ associated first location (i.e. GPS coordinates). At block 406, the BCU then determines a second coefficient of friction ($\mu$) and a second wheel slip ($\lambda$) at a second time $t_2$ associated second location (i.e. GPS coordinates). Having determined two values for each of the coefficient of friction ($\mu$) and the wheel slip ($\lambda$), the BCU estimates a peak coefficient of friction ($\mu_{Peak}$) for at least one of the first location or the second location, with the operation returning to block 402 thereafter to determine peak coefficient of friction ($\mu_{Peak}$) values at numerous location on the runway and taxiway leading to a gate where the airplane will be parked.

Accordingly, the various embodiments, utilize a determined coefficient of friction ($\mu$) and wheel slip ($\lambda$) to estimate peak coefficient of friction ($\mu_{Peak}$) for runways as well taxiways even when the brake system is not in antiskid mode. This estimated peak coefficient of friction ($\mu_{Peak}$) improves the safety operation of aircraft around airports and reduces the amount of work needed to estimate runway conditions using equipment.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for estimating a peak coefficient of friction ($\mu_{Peak}$) at a location on a runway or taxiway, the method comprising:

responsive to detecting braking of an aircraft:

determining a first coefficient of friction (μ) and a first wheel slip (λ) at a first time $t_1$ associated with a first location; and determining a second coefficient of friction (μ) and a second wheel slip (λ) at a second time $t_2$ associated with a second location; and estimating the peak coefficient of friction ($\mu_{Peak}$) for at least one of a first location or a second location using a coefficient of friction and wheel slip curve equation to resolve for peak wheel slip (λPeak) and the peak coefficient of friction (μPeak) using a numerical method.

2. The method of claim 1, wherein the first coefficient of friction (μ) and the second coefficient of friction (μ) are determined using aircraft deceleration $a_x$, an aerodynamic drag force ($F_{aero}$), a thrust force ($F_{tr}$), a mass (m) of an aircraft, and a gravitational constant (g).

3. The method of claim 2, wherein the mass of the aircraft is a portion of a total mass of the aircraft and wherein the portion of the total mass of the aircraft is the portion associated with a landing gear where the first coefficient of friction (μ) and the second coefficient of friction (μ) are being determined.

4. The method of claim 2, wherein the aircraft deceleration $a_x$ is determined using a force applied to brakes of the aircraft ($F_{brk}$), the aerodynamic drag force ($F_{aero}$), the thrust force ($F_{tr}$), and the mass (m) of the aircraft.

5. The method of claim 4, wherein the mass of the aircraft is a portion of a total mass of the aircraft and wherein the portion of the total mass of the aircraft is the portion associated with a landing gear where the first coefficient of friction (μ) and the second coefficient of friction (μ) are being determined.

6. The method of claim 1, wherein the first wheel slip (λ) and the second wheel slip (λ) are determined using a velocity (v) of the aircraft, a radius (R) of a wheel and a tire of a landing gear together, and a rotation (ω) of the wheel.

7. The method of claim 6, wherein the radius (R) of the wheel and the tire of the landing gear together is reduced by a deflection of the tire upon landing.

8. The method of claim 6, wherein the rotation (ω) of the wheel is determined using a wheel speed sensor.

9. The method of claim 1, further comprising:

determining a coefficient of friction (μ) and a wheel slip (λ) every time t from initial touchdown on the runway or taxiway to parking the aircraft at a gate, wherein an antiskid mode of a brake system is inactive during at least a portion of the determining; and estimating a separate peak coefficient of friction ($\mu_{Peak}$) for each two contiguous times $t_1$ and $t_2$.

10. The method of claim 1, further comprising:

reporting the estimated peak coefficient of friction ($\mu_{Peak}$) to at least one of an airport authority or another aircraft.

11. A system for estimating a peak coefficient of friction ($\mu_{Peak}$) at a location on a runway or taxiway during braking of an aircraft, the system comprising:

a brake control unit, wherein the brake control unit is configured to:

determine a first coefficient of friction (μ) and a first wheel slip (λ) at a first time $t_1$ associated with a first location;

determine a second coefficient of friction (μ) and a second wheel slip (λ) at a second time $t_2$ associated with a second location; and estimate the peak coefficient of friction ($\mu_{Peak}$) for at least one of a first location or a second location using a coefficient of friction and wheel slip curve equation to resolve for peak wheel slip (λPeak) and the peak coefficient of friction (μPeak) using a numerical method.

12. The system of claim 11, wherein the first coefficient of friction (μ) and the second coefficient of friction (μ) are determined using aircraft deceleration $a_x$, an aerodynamic drag force ($F_{aero}$), a thrust force ($F_{tr}$), a mass (m) of an aircraft, and a gravitational constant (g).

13. The system of claim 12, wherein the mass of the aircraft is a portion of a total mass of the aircraft and wherein the portion of the total mass of the aircraft is the portion associated with a landing gear where the first coefficient of friction (μ) and the second coefficient of friction (μ) are being determined.

14. The system of claim 12, wherein the aircraft deceleration $a_x$ is determined using a force applied to brakes of the aircraft ($F_{brk}$), the aerodynamic drag force ($F_{aero}$), the thrust force ($F_{tr}$), and the mass (m) of the aircraft.

15. The system of claim 14, wherein the mass of the aircraft is a portion of a total mass of the aircraft and wherein the portion of the total mass of the aircraft is the portion associated with a landing gear where the first coefficient of friction (μ) and the second coefficient of friction (μ) are being determined.

16. The system of claim 11, wherein the first wheel slip (λ) and the second wheel slip (λ) are determined using a velocity (v) of the aircraft, a radius (R) of a wheel and a tire of a landing gear together, and a rotation (ω) of the wheel.

17. The system of claim 16, wherein the radius (R) of the wheel and the tire of the landing gear together is reduced by a deflection of the tire upon landing.

18. The system of claim 16, wherein the rotation (ω) of the wheel is determined using a wheel speed sensor.

19. The system of claim 11, wherein the brake control unit is configured to:

determine a coefficient of friction (μ) and a wheel slip (λ) every time t from initial touchdown on the runway or taxiway to parking the aircraft at a gate, wherein an antiskid mode of the brake control unit is inactive during at least a portion of the determining; and estimate a separate peak coefficient of friction ($\mu_{Peak}$) for each two contiguous times $t_1$ and $t_2$.

20. The system of claim 11, wherein the brake control unit is configured to:

report the estimated peak coefficient of friction ($\mu_{Peak}$) to at least one of an airport authority or another aircraft.

* * * * *